US009100927B2

(12) United States Patent
Gottimukkala et al.

(10) Patent No.: US 9,100,927 B2
(45) Date of Patent: Aug. 4, 2015

(54) SOFTWARE FEED FORWARD STRATEGY TO AVOID HAND-SHAKING DELAYS BETWEEN SOFTWARE AND FIRMWARE

(71) Applicant: QUALCOMM Incorporated, San Diego, CA (US)

(72) Inventors: Narendra Varma Gottimukkala, San Diego, CA (US); Erdogan Dede, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/919,279

(22) Filed: Jun. 17, 2013

(65) Prior Publication Data

US 2014/0370892 A1 Dec. 18, 2014

(51) Int. Cl.
| | |
|---|---|
| H04W 4/00 | (2009.01) |
| H04W 60/00 | (2009.01) |
| G06F 9/48 | (2006.01) |
| H04W 72/12 | (2009.01) |

(52) U.S. Cl.
CPC ............. *H04W 60/005* (2013.01); *G06F 9/48* (2013.01); *H04W 72/1215* (2013.01)

(58) Field of Classification Search
CPC ...... H04W 60/02; H04W 60/04; H04W 60/60
USPC ........ 455/418, 434, 435.1, 435.2, 436, 552.1, 455/552.2; 370/329; 375/267
See application file for complete search history.

(56) References Cited

U.S. PATENT DOCUMENTS

| | | | |
|---|---|---|---|
| 8,200,161 B2 | 6/2012 | Walley et al. | |
| 2009/0180451 A1* | 7/2009 | Alpert et al. | 370/338 |
| 2010/0137025 A1 | 6/2010 | Tal et al. | |
| 2010/0322287 A1 | 12/2010 | Truong et al. | |
| 2012/0213303 A1 | 8/2012 | Kadous et al. | |
| 2012/0327869 A1 | 12/2012 | Wang et al. | |
| 2012/0327912 A1* | 12/2012 | Kirveskoski | 370/336 |
| 2013/0288741 A1* | 10/2013 | Sjadieh et al. | 455/552.1 |
| 2014/0004842 A1* | 1/2014 | Lindoff et al. | 455/418 |

OTHER PUBLICATIONS

International Search Report and Written Opinion—PCT/US2014/041148—ISA/EPO—Dec. 17, 2014.

(Continued)

*Primary Examiner* — Amancio Gonzalez
(74) *Attorney, Agent, or Firm* — The Marbury Law Group, PLLC

(57) ABSTRACT

Methods for enabling a mobile device to efficiently resolve coexistence issues in a DSDA configuration by utilizing a feed forward strategy to avoid hand-shaking between software-implemented operations and firmware. The mobile device may employ a dual subscription, dual active (or "DSDA") configuration in which two or more subscriptions may be associated with concurrently active communications, such as voice or data calls. The mobile device may be configured to predict activity associated with the concurrently active subscriptions, such as determining operations likely to be performed in a future time period. Such predicted activity information, as well as predefined actions and priority information, may be provided to a library common to both subscriptions. Firmware of the subscriptions may use the common library to detect current conflicts, such as desense, as well as actions to perform to resolve coexistence issues, such as blanking operations.

36 Claims, 9 Drawing Sheets

(56) References Cited

OTHER PUBLICATIONS

Kiminki S., et al., "Coexistence-aware Scheduling for LTE and WLAN during Hard in-Device Interference" Cognitive Radio Oriented Wireless Networks and Communications (CROWNCOM), 2012 7th International ICST Conference on, IEEE, Jun. 18, 2012, pp. 1-6, XP032296912.

* cited by examiner

400

| | | W/C/T data | W/C/T voice | G data | G voice |
|---|---|---|---|---|---|
| SIM-2 Single Mode G | G voice | SIM-1<br>• HSPA Cat.14/Cat.6 DL/UL<br>• RxD supported<br><br>SIM-2<br>• DTM Class 11<br><br>402 | SIM-1<br>• 3-way calling across SIM-1, SIM-2 supported (one only audio path at a time connected)<br>• AMR-WB supported<br><br>SIM-2<br>• DTM Class 11<br><br>404 | SIM-1<br>• EDGE MSC-33<br><br><br><br><br><br>SIM-2<br>• DTM Class 11<br><br>406 | SIM-1<br>• 3-way calling across SIM-1, SIM-2 supported (one only audio path at a time connected)<br>• AMR-WB supported<br><br>SIM-2<br>• DTM Class 11<br><br>408 |
| | G data | SIM-1<br>• HSPA Cat.14/Cat.6 DL/UL<br>• RxD supported<br><br>SIM-2<br>• EDGE MSC-33<br>• DTM-Class 11<br><br>410 | SIM-1<br>• AMR-WB supported<br><br><br>SIM-2<br>• EDGE MSC-33<br>• DTM-Class 11<br><br>412 | SIM-1<br>• EDGE MSC-33<br><br><br>SIM-2<br>• EDGE MSC-33<br>• DTM-Class 11<br><br>414 | SIM-1<br>• AMR-WB supported<br><br><br>SIM-2<br>• EDGE MSC-33<br>• DTM-Class 11<br><br>416 |

SIM-1: Multi-mode WCDMA/C2K/GSM/TDSCDMA/LTE

FIG. 4

SOFTWARE FEED FORWARD STRATEGY TO AVOID HAND-SHAKING DELAYS BETWEEN SOFTWARE AND FIRMWARE

BACKGROUND

Modern mobile devices are now often configured to utilize multiple subscriptions associated with various communication technologies for providing voice and/or data services to users. A multiple subscription mobile device may include a subscriber identification module (i.e., SIM or SIM card) for each subscription (or radio frequency chain) to enable data exchanges with different access networks. For example, the mobile device may use one subscription with a SIM card for a first carrier's access network and a second subscription with a second SIM card for a second access network. Multiple subscription devices may be especially useful in limiting roaming and long distance call fees (e.g., one subscription for Country A, another for Country B) and in differentiating services offered (e.g., one subscription for business use, another subscription for personal use, one subscription for data, another subscription for voice, etc.).

Some devices may be configured to operate as Dual Subscription, Dual Standby (or DSDS) mobile devices that may use a single radio frequency along with two SIMs and two modem stacks. DSDS devices may be enabled to transmit/receive a single voice call on a first SIM at a time, but may also exchange data on a second SIM concurrently. However, DSDS devices often suffer from degraded data throughput due to tune-away operations for monitoring and/or decoding data (e.g., pages), as well as the limitation of missing voice calls directed to a subscription when another subscription is being used for a voice call.

On the other hand, Dual Subscription, Dual Active (or DSDA) mobile devices may be configured to employ two or more transmit/receive (Tx/Rx) chains and transceivers to simultaneously exchange voice and/or data with different access networks and/or accounts. In other words, DSDA mobile devices may allow multiple SIMs (or SIM cards) to be active at the same time and may be connected to multiple networks at the same time. For example, a DSDA mobile device may initiate an active phone call on a first network, place the call on a local hold, and initiate another active phone call on the second network. DSDA mobile devices may switch between two calls without dropping either, enabling the receipt of a second call while maintaining a first call. DSDA mobile devices may have better performance than DSDS devices, as DSDA mobile devices may not experience tune away when on a data call since DSDA mobile devices have a second chain for monitoring pages. Further, DSDA mobile devices may receive call indications on a second subscription using the second chain when simultaneously on a voice call on a first subscription.

However, simultaneous communications in a DSDA mobile device may encounter coexistence issues that impact the performance of the mobile device. In particular, the transmit and/or receive chains of one subscription may encounter radio frequency coexistence issues, such as "desense" (i.e., radio interference that impacts the wireless link) based on the activity of the other subscription. For example, in certain band class combinations, the transmit (Tx) activity of one subscription may degrade the receive (Rx) operations on other subscriptions due to insufficient isolation in radio frequency hardware elements. Concurrently active subscriptions may also over-stress the processing capabilities of the mobile device (e.g., modem DSP processor overload), as well as other modules related to various signaling technologies (e.g., GPS and WLAN). For example, two active radio access technologies associated with subscriptions may not be able to support all their feature capabilities or max throughput due to insufficient horse power of a modem DSP processor. Additionally, concurrently active subscriptions may cause the mobile device to operate in violation of the amount of radio frequency radiation that can be emitted and absorbed in tissues of the user that are imposed by the Federal Communications Commission (FCC) (i.e., operate with unacceptable specific absorption rates or "SAR"). Power requirements inherent to DSDA functions may further drain the device battery (i.e., the device may operate with suboptimal battery current use and may require battery current limiting or "BCL").

To avoid performance implications of such coexistence issues, the DSDA mobile device may need to perform various actions, such as Tx or RX blanking and firmware operation re-scheduling. However, determining the appropriate actions to take may require data from software that may slow otherwise fast firmware operations. Further, when a subscription in a DSDA mobile device has multi-mode capability, inter radio access technology concurrency issues may be experienced. Some existing techniques to assist DSDA mobile device performance may exist that use hardware and general purpose input/outputs to fire interrupts to notify radio access technology activities. However, these techniques may involve expensive, long operations that may include transmitting software information to logic components to analyze operating conditions (e.g., potential collisions/RAT interference, etc.) and then provide feedback to the software for further decision-making. For example, other techniques may involve numerous, synchronous acknowledgment signals (or ACK signals) between RAT software and a mobile device firmware in order to detect whether a coexistence scenario exists and determine how to handle it.

SUMMARY

The various embodiments enable a DSDA mobile device to efficiently resolve performance issues that may occur when two services attempt to use radio frequency (RF) resources simultaneous by utilizing a feed forward strategy to avoid hand-shaking delays between software and firmware processes for mitigating such issues. In general, a coexistence manager may receive parameters and other information from concurrently active subscriptions that the coexistence manager may use to detect whether coexistence issues exist, such as radio frequency coexistence issues (i.e., desense condition) and unacceptable SAR/battery current use. Additionally, at regular time periods, the coexistence manager may receive predicted activity information about the subscriptions. The received information may be used by the coexistence manager to determine how the subscriptions should behave or the mitigation actions that should be taken when coexistence issues would otherwise occur. In various embodiments, the coexistence manager may be configured to receive and process such information from more than two subscriptions/RF chains.

When coexistence issues (e.g., conflicts between the concurrently active subscriptions, unacceptable specific absorption rate, suboptimal battery current use, etc.) are detected or predicted based on this received information, the received information may be used by the coexistence manager to schedule the activities of the subscriptions to avoid degraded performance. For example, when an operating state that is causing or may cause a desense condition is detected or predicted, the coexistence manager may issue commands so that a receiving operation on a first subscription proceeds over a transmission on a second subscription. The coexistence manager may be firmware (and/or a firmware library) that is common to the multiple subscriptions in the mobile device and may be configured to receive and store data from the firmware and software associated with the subscriptions.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 4 is a table illustrating various functionalities concurrently available in an embodiment DSDA mobile device.

DETAILED DESCRIPTION

Figure 1:
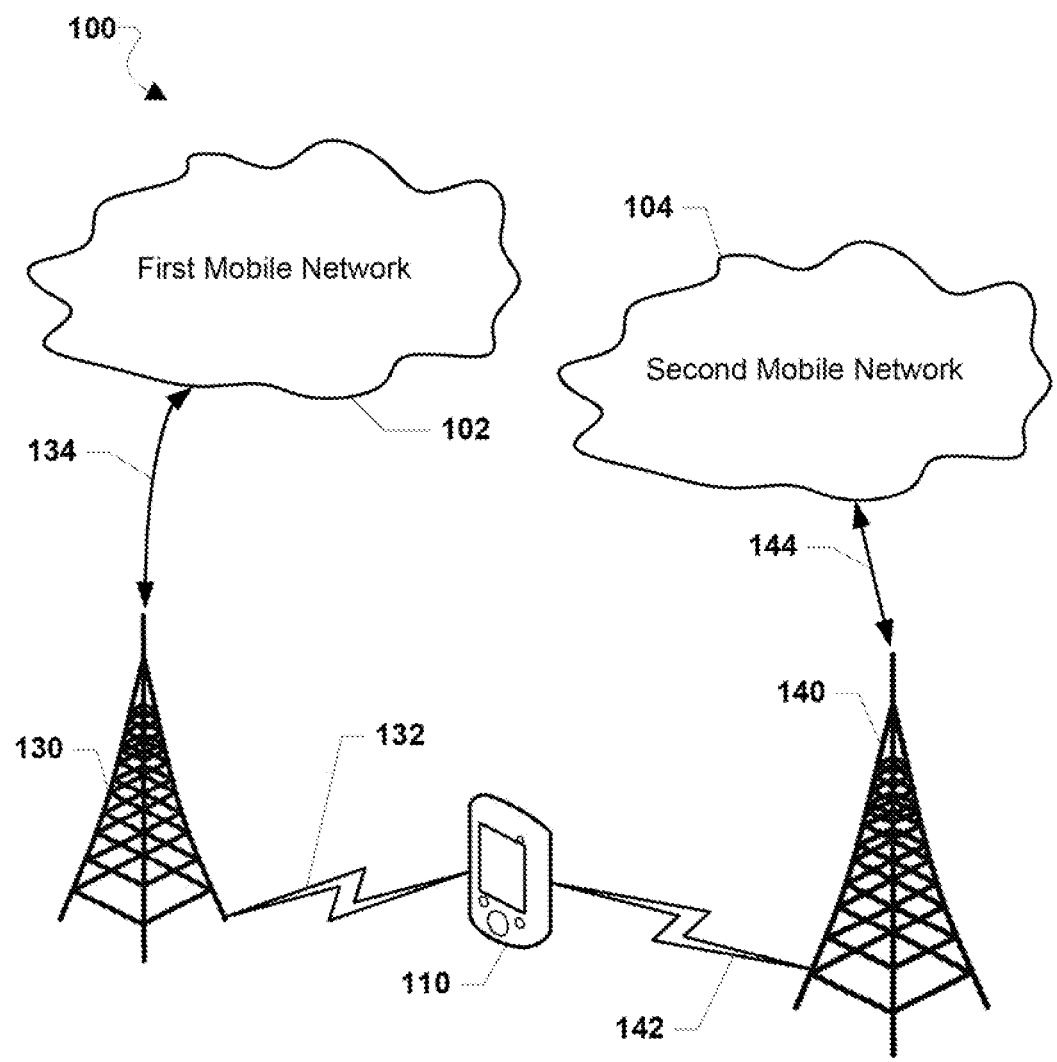
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "subscription" is used herein to refer to a service or technology that is accessible on a mobile device and that is associated with a particular communication network and/or account. For example, a subscription may correspond to a data/talk service from AT&T, Verizon, or other network providers. Subscriptions may be affiliated with dedicated circuitry, modules, software instructions, and/or other components that enable the mobile device to exchange voice calls, media, or any data with various networks, such as Long Term Evolution (LTE), Third Generation (3G), Fourth Generation (4G), Wi-Fi®, and various other wireless networks. In particular, a subscription may be associated with a subscriber identification module (SIM or SIM card) that may store data for communicating over an access network.

The term "mobile device" is used herein to refer to any one or all of cellular telephones, smart-phones (e.g., iPhone®), web-pads, tablet computers, Internet enabled cellular telephones, Wi-Fi® enabled electronic devices, personal data assistants (PDA's), laptop computers, personal computers, and similar electronic devices equipped with at least a wide area network connection (e.g., an LTE, 3G or 4G wireless wide area network transceiver or a wired connection to the Internet). In various embodiments, mobile devices may also include a global positioning system (GPS) receiver, chip, circuitry, module, or other components for communicating with GPS satellites. The term "DSDA mobile device" is used herein to refer to a mobile device that includes at least two technologies (e.g., subscriptions) configured to concurrently exchange communications, such as a data call and/or a voice call, with separate providers (e.g., cellular network providers/carriers, etc.). For example, a DSDA mobile device may utilize four SIM cards (i.e., quad-SIM). In various embodiments, a DSDA mobile device may include multiple multi-mode technologies, such as a first SIM card configured for wideband code division multiple access (or WCDMA) communications and a second SIM card also configured to support WCDMA communications.

The various embodiments provide techniques that enable efficient decision-making at the microscopic time intervals and high time resolution used by firmware of DSDA mobile devices to avoid impacting performance of radio technologies from collisions between two services that may degrade their reception and/or transmission. In particular, various embodiments provide methods for implementing a feed forward software strategy to avoid delays in responding to co-existence issues due to the hand-shaking that must otherwise occur between software-implemented mitigating actions and firmware in a Dual Subscription, Dual Active (DSDA) mobile device. Embodiment methods may enable software-implemented operations associated with a subscription to predict activity of the subscription and provide operating configurations ahead of predicted coexistence conditions. Firmware associated with an active subscription may utilize quick turnaround library functions common to all concurrent, active subscriptions of the mobile device to identify conflicts and to schedule blanking of lower-priority operations based on priority schemes defined by software-implemented operations of the subscriptions. By utilizing predicted or pre-provided data that has been fed forward to the common library, the DSDA mobile device may avoid inefficient exchanges (e.g., feedback-type exchanges) between software-implemented mitigating actions and the firmware that supports active subscriptions, and thus may optimize the handling of coexistence conditions. For example, software of concurrent radio access technologies (or RATs) may provide a coexistence manager (or common library) with various parameters and in return may simply receive commands or other actions to perform without further decision-making required at the software level.

In an embodiment, during a registration period, software-implemented operations corresponding to the subscriptions may generate actions, configurations, operations, prioritization schemes, parameters, or other information that firmware may utilize when coexistence issues exist (e.g., unacceptable SAR, desense, etc.). Such actions may include back-off and/or blanking operations. For example, the software-implemented operations of a first subscription may generate a rule set that indicates the actions, commands, routines, or instructions to perform when particular conditions or operations of the subscription are encountered, such as the scheduling of a transmit (Tx) operation. As another example, the software-implemented operations may generate instructions for firmware to perform when certain operations of the subscription are determined to be lower in priority than operations of another subscription. In other words, the information generated by software-implemented operations of a particular subscription includes the operations and logic that firmware associated with that subscription needs in order to schedule operations of that subscription in relation to concurrent operations of another subscription. The coexistence manager may store this generated information so that it may be accessed by the coexistence manager and/or the firmware associated with the various subscriptions. In an embodiment, such information may also be used by firmware to restore cancelled subscription operations and/or detect conflicts. In another embodiment, the software-implemented operations may provide actions and configurations for the firmware to use to schedule operations when there is no coexistence issue or conflict between the concurrently active subscriptions.

The software-implemented operations of the subscriptions may periodically predict the states, operations, and/or activities of the respective subscriptions for future time periods. The software-implemented operations may use current activity information, such as timestamp information of Tx/Rx operations, to predict the future activities. For example, based on current operations (e.g., receiving a data call), the software-implemented operations of a first subscription may predict that the subscription will be performing a receiving operation corresponding to a voice call in 1-2 milliseconds. Such predicted information may be stored by the coexistence manager. In various embodiments, software-implemented operations may provide the coexistence manager with predicted activity information for a future time period at the beginning or end of a predecessor time period.

During the operation of the mobile device, firmware associated with the subscriptions may utilize information maintained by the coexistence manager to identify conflicts and schedule operations. In particular, firmware may use the predicted activity of the subscriptions to quickly identify coexistence issues (e.g., just-in-time detections of desense conditions). For example, firmware may detect whether the activities of the subscriptions overlap or whether desense of a first subscription is occurring. If no coexistence issues exist, the firmware may not modify the schedule of operations of the subscriptions. However, if coexistence issues do exist, the firmware may use the coexistence manager to perform the actions defined by software-implemented operations during registration to identify the priorities of operations without having to receive real-time information from the software-implemented operations. The firmware may cause lower priority operations to yield or freeze, such as instructed by blanking or back-off actions predefined by the software-implemented operations. (Blanking may refer to operations performed by the firmware to protect lower priority subscriptions from going out-of-order, such as operations to switch off a radio frequency during receiving). Using the various information maintained by the coexistence manager, firmware may avoid costly feedback operations and make fast decisions (e.g., in less than a microsecond), thereby avoiding loss of performance of the mobile device. In various embodiments, firmware may poll for activity of other subscriptions or radio access technologies using the coexistence manager at the firmware's natural interrupt rate, and thus may not incur additional interrupt overheads.

In an embodiment, the firmware may determine conflicts and schedule operations over many small activity intervals within a timeframe (time period). In other words, the predicted activity information for a time period may include predicted activity for several activity intervals. In various embodiments, the firmware may make calls to the coexistence manager at a regular interval (e.g., every certain number of microseconds). For example, the firmware may execute interrupts at a rate of once every 66 microseconds.

In an embodiment, software-implemented operations may indicate to which subscription (or SIM) radio access technologies and/or operations are associated in order to avoid competition for resources by RATs/operations associated with the same subscription. In other words, RATs/operations of the same subscription may not be treated as contenders in relation to each other. For example, when enabling a coexistence manager, radio access technologies handled by the same subscription (or SIM) may not be treated as contenders, and the technologies may be considered to have the same priority. In another embodiment, when executing a conflict check, the DSDA mobile device may utilize a separate buffer for each technology associated with a subscription. For example, a common library or coexistence manager may store activity data associated with the receiving operations (Rx) of a particular subscription separately from stored activity data associated with the transmitting operations (Tx) of the particular subscription.

In another embodiment, software-implemented operations associated with a radio access technology may indicate to a common library (or coexistence manager) that the technology is predicted to be or known to be inactive during a certain period of time. In such a case, the firmware associated with the technology may not perform operations to check for conflicts related to the technology. For example, no APIs or common library calls that detect for conflicts may be made by firmware when associated technology is predicted to be inactive for a certain period.

Those skilled in the art should appreciate that the embodiment methods for scheduling operations of concurrently active subscriptions may be similarly applied to schedule operations of inter radio access technologies associated with the same SIM or subscription. For example, coexistence issues may not only be confined to two separate radio access technologies on two different subscriptions, but instead may also include desense issues related to inter radio access technology (or IRAT) operations on a multi-mode subscription. For example, coexistence issues may be detected in a device utilizing various technology modes, such as a WCDMA/GSM (IRAT) mode (or W/G (IRAT)+G), a CDMA2000+GSM mode (or C+G), a TDSCDMA/GSM (IRAT) mode (or T/G (IRAT)+G), a LTE/GSM (IRAT) mode (or L/G (IRAT)+G), etc.

The various embodiment methods may be performed by embodiment mobile devices that include integrated baseband chips. For example, the modem processor described within this disclosure may be an integrated baseband processor or chip that may process all wireless signals received and/or transmitted by the mobile device. The use of such an integrated baseband chip is a key difference between the disclosed embodiments and other technologies, as the integrated baseband chip enables for efficient coordination of resources between concurrently active subscriptions.

The various embodiments may be implemented in mobile devices configured to perform operations to support multiple concurrent subscriptions; however, the embodiment methods may have further application in dual-subscription, dual active mobile devices. For example, a mobile device configured to utilize concurrent technologies that are not communication subscriptions may execute the following embodiment methods to more efficiently allocate resources. Additionally, mobile devices having technologies that correspond to connectivity and that may not involve a modem, such as delay-sensitive applications that utilize a wireless local area network (e.g., WiFi-Display) or Bluetooth® radios, may also utilize the various embodiment methods to prioritize services or technologies and allocate mobile device resources.

The various embodiments may be implemented within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first DSDA mobile device 110 may be in communication with the first mobile network 102 through a cellular connection 132 to a first base station 130. The first DSDA mobile device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144. Cellular connections 132 and 142 may be made through two-way wireless communication links using various technology protocols or standards, such as 4G, 3G, long term evolution (LTE), code division multiple access (CDMA), Time Division Synchronous Code Division Multiple Access (TD-SCDMA), wideband code division multiple access (WCDMA), global system for mobile communications (GSM), and other mobile telephony communication technologies.

Figure 2:
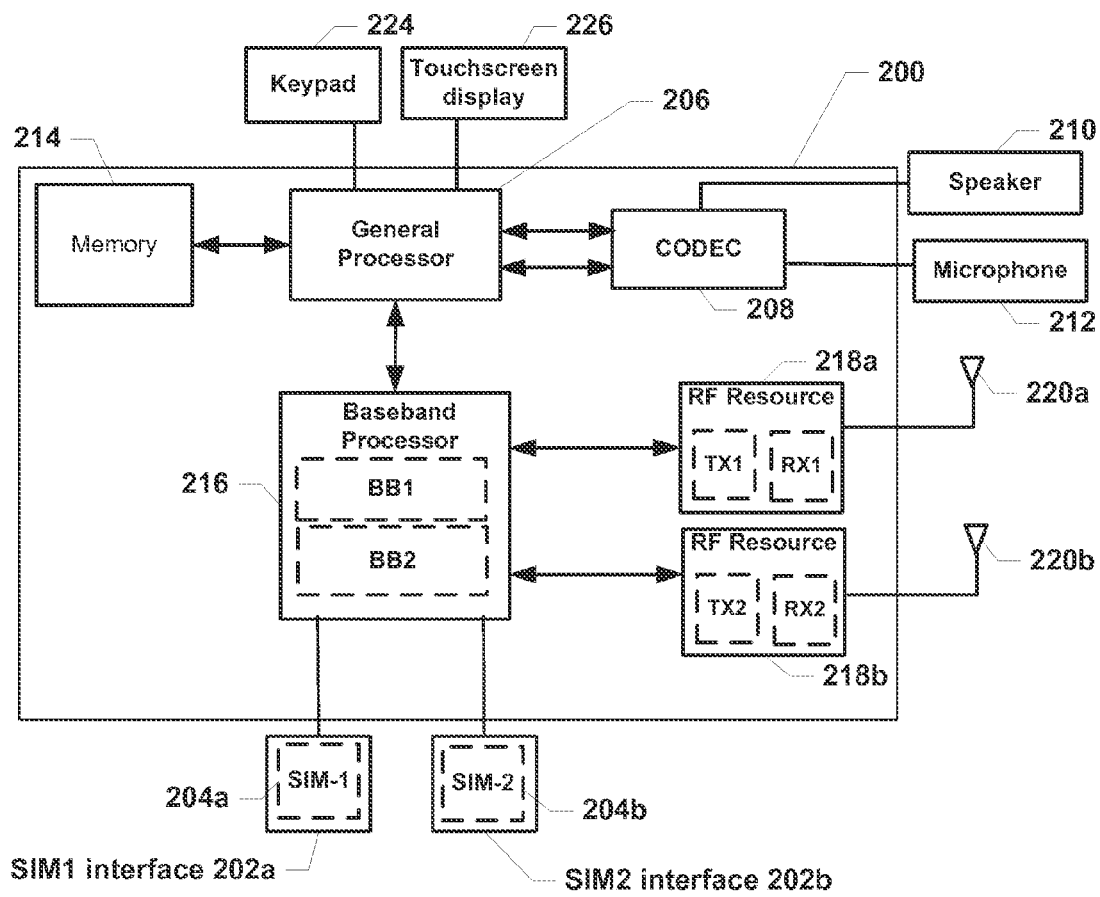
FIG. 2 is a block diagram illustrating a dual-SIM dual active mobile device according to an embodiment.

FIG. 2 is a functional block diagram of a DSDA mobile device 200 that is suitable for implementing the various embodiments. The DSDA mobile device 200 may include a first subscriber identity module (SIM) interface 202a, which may receive a first subscriber identity module 204a (referred to as SIM-1 in FIG. 2) that is associated with the first subscription. The DSDA mobile device 200 may also include a second subscriber identity module (SIM) interface 202b, which may receive a second identity module 204b (referred to as SIM-2 in FIG. 2) that is associated with the second subscription.

A SIM in the various embodiments may be a Universal Integrated Circuit Card (UICC) that is configured with SIM and/or universal subscriber identity module (USIM) applications, enabling access to, for example, global system for mobile communications (or GSM) and/or universal mobile telecommunications system (or UMTS) networks. The UICC may also provide storage for a phone book and other applications. Alternatively, in a code division multiple access (or CDMA) network, a SIM may be a UICC removable user identity module (R-UIM) or a CDMA subscriber identity module (CSIM) on a card.

Each SIM card may have processor (or CPU), read-only memory (ROM), random access memory (RAM), electrically erasable programmable read-only memory (EEPROM) and input/output (I/O) circuits. A SIM (or SIM card) used in the various embodiments may contain user account information, an international mobile subscriber identity (IMSI), a set of SIM application toolkit (SAT) commands and storage space for phone book contacts. A SIM card may further store a Home Public-Land-Mobile-Network (HPLMN) code to indicate the SIM card network operator provider. An Integrated Circuit Card Identity (ICCID) SIM serial number may be printed on the SIM card for identification.

Each DSDA mobile device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain.

The memory 214 may store operating system (OS), as well as user application software and executable instructions. The memory 214 may also store application data, such as an array data structure.

The general processor 206 and memory 214 may each be coupled to at least one baseband modem processor 216. Each SIM in the DSDA mobile device 200 (e.g., SIM-1 204a and SIM-2 204b) may be associated with a baseband-RF resource chain. Each baseband-RF resource chain may include a baseband modem processor 216 to perform baseband/modem functions for communications on a SIM, and one or more amplifiers and radios, referred to generally herein as radio frequency (RF) resources. In one embodiment, baseband-RF resource chains may share a common baseband modem processor (i.e., a single device that performs baseband/modem functions for all SIM cards on the wireless device). Alternatively, each baseband-RF resource chain may include physically or logically separate baseband processors (e.g., BB1, BB2).

RF resources 218a, 218b may each be transceivers that perform transmit/receive functions for the associated SIM of the wireless device. RF resources 218a, 218b may include separate transmit and receive circuitry, or may include a transceiver that combines transmitter and receiver functions. The RF resources 218a, 218b may be coupled to a wireless antenna (e.g., a first wireless antenna 220a and a second wireless antenna 220b). The RF resources 218a, 218b may also be coupled to the baseband modem processor 216.

In a particular embodiment, the general processor 206, memory 214, baseband processor(s) 216, and RF resources 218a, 218b may be included in the DSDA mobile device 200 as a system-on-chip. In another embodiment, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the DSDA mobile device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the DSDA mobile device 200 to enable communication between them, as is known in the art.

Figure 3:
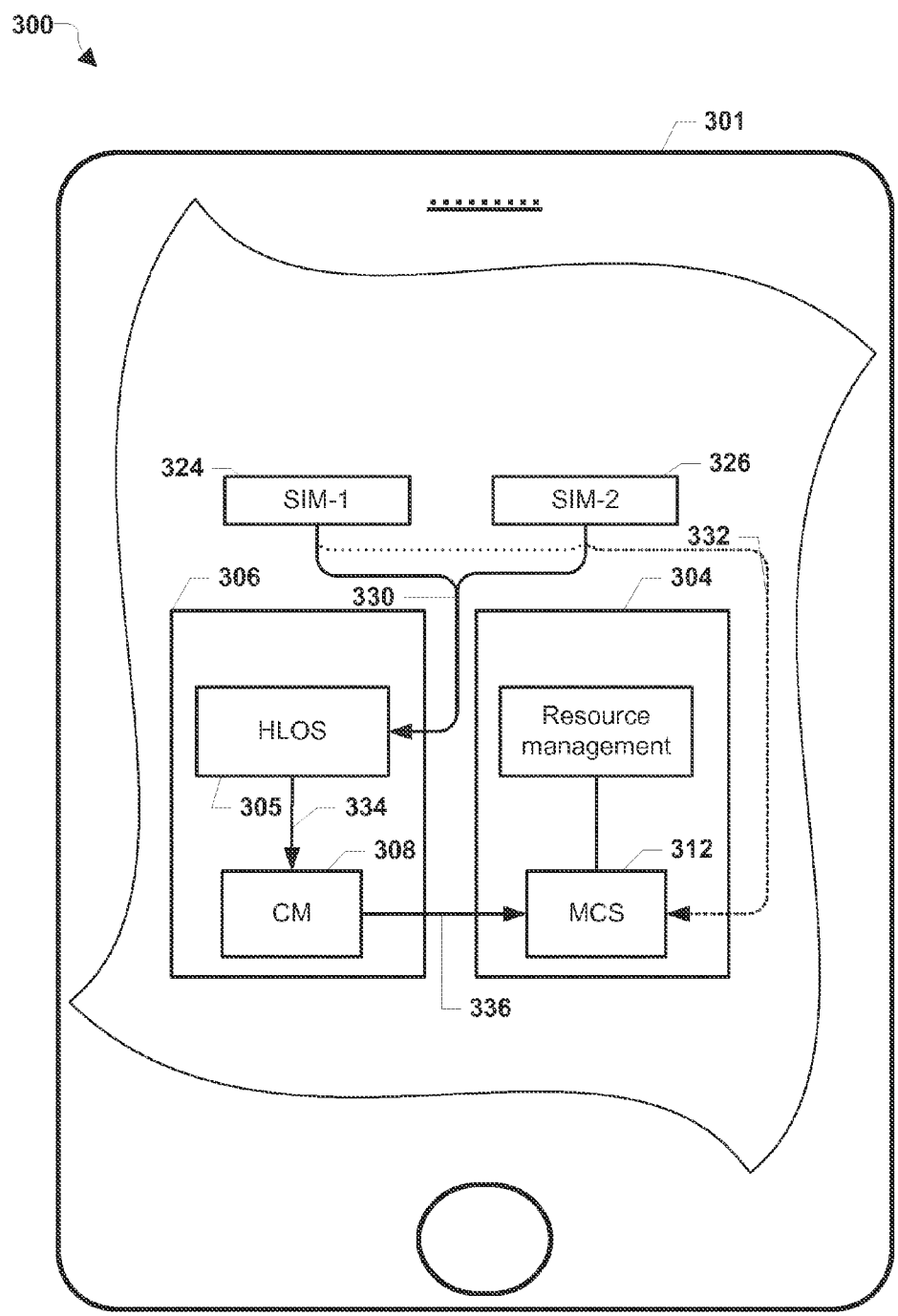
FIG. 3 is a diagram illustrating an embodiment mobile device that may include an applications processor and a modem processor for enabling a dual subscription, dual active ("DSDA") configuration.

FIG. 3 is a diagram 300 illustrating an embodiment dual subscription, dual active (DSDA) mobile device 301 that may include an applications processor 306 and a modem processor 304. The mobile device 301 may include a first SIM card (or chip) 324 (referred to in FIG. 3 as "SIM-1") that is associated with a first subscription, and a second SIM card 326 (referred to in FIG. 3 as "SIM-2") that is associated with a second subscription. As described above with reference to FIG. 2, the SIM cards 324, 326 may be software, circuitry, routines, or modules that perform operations to utilize technology related to particular services and/or networks (e.g., LTE, 3G, etc.). For example, the first SIM card 324 may be used by the mobile device 301 to exchange voice and data information with a first access network and the second SIM card 326 may be used to exchange voice and data information with a second access network. Both SIM cards 324, 326 may exchange signals 330 with the applications processor 306. The applications processor 306 may be a primary processing unit of the mobile device 301 and may be used to perform operations related to a high-level operating system 305 (referred to in FIG. 3 as "HLOS"). The HLOS 305 may receive and process signals 330 from the SIM cards 324, 326, such as network identification keys, software, and other data related to incoming and outgoing voice and/or data packets. As described below, the signals 330 may indicate various parameters related to the state of the subscriptions that the mobile device 301 may utilize to schedule the operations of the subscriptions. For example, the signals 330 may indicate receiving or transmitting activity and/or priority information of a subscription.

In an embodiment, the HLOS 305 may transmit signals 334 to a call manager 108 (referred to as "CM" in FIG. 3). The call manager 308 may be a module, circuitry, software-implemented operations, or other routines utilized by the applications processor 306 for communicating with the modem processor 304. The HLOS 305 may provide the call manager 308 with information that indicates updates, designations, settings, or other configurations of the SIM cards 324, 326 and/or the subscriptions. For example, the HLOS 305 may pass state information of active subscriptions to the call manager 308. In an embodiment, the HLOS 305 may have a radio interface layer, or software component for each subscription the mobile device 301 is configured to support. Such radio interface layers may be used by the mobile device 301 for facilitating data flow between software-implemented operations or applications running on the applications processor 306 and the firmware and/or hardware of the mobile device 301 (e.g., a modem).

The call manager 308 may bundle information received via signals 334 (e.g., subscription state information, SIM designation information, etc.) and transmit signals 336 to a modem common services 312 component (referred to as "MCS" in FIG. 3). The MCS 312 may be executed, supported, and/or otherwise controlled by the modem processor 304. In an embodiment, the MCS 312 may match signals 336 to active technologies (such as active subscriptions) using active subscription identifiers. The MCS 312 may store data provided by the software of the mobile device 301, such as configurations and/or priority information related to the activities of the SIM cards 324, 326. In an embodiment, the modem processor 304 may receive information via signals 332 from the SIM cards 324, 326. For example, the signals 332 may include non-critical state information the modem processor 304 may utilize to identify a subscription that is transmitting data as opposed to voice information and/or to identify a subscription that is on local-hold.

In various embodiments, the mobile device 301 may utilize the applications processor 306 to identify the states of concurrently active subscriptions. The applications processor 306 may access information that indicates whether subscriptions correspond to voice calls, calls on local hold, or data calls, as well as other states and/or characteristics. Further, based on predefined priority information, such as data tables and/or equations, the modem processor 304 may determine the active subscription that has a higher priority. For example, the modem processor may determine the priority or rank of operations of a first subscription based on a data table entry, and may compare that rank to a second subscription's rank to determine the subscription with the higher priority.

FIG. 4 illustrates a table 400 describing various functionalities concurrently available in an embodiment DSDA mobile device. As described above, various DSDA mobile devices may include a plurality of SIM cards (e.g., two SIMs, four SIMs, etc.) that may utilize different communication technologies. As an illustration, the DSDA mobile device may include a first subscription and associated SIM (e.g., "SIM-1" in FIG. 4) that utilizes WCDMA technology, and a second subscription and associated SIM (e.g., "SIM-2" in FIG. 4). In particular, the first subscription may be configured to operate in multiple modes (i.e., a multi-mode SIM) that may include features based on the technologies such as WCDMA, time division synchronous code division multiple access (or TDSCDMA), C2K (or C2000), LTE, and GSM. For example, the first subscription may be configured to operate in a mode that utilizes WCDMA, C2K, or TDSCDMA to process data (or "W/C/T data" mode as referred to in FIG. 4), a mode that utilizes WDCDMA, C2K, or TDSCDMA to process voice information (or "W/C/T voice" mode as referred to in FIG. 4), a mode that utilizes GSM to process data (or "G data" mode as referred to in FIG. 4), and a mode that utilizes GSM to process voice information (or "G voice" mode as referred to in FIG. 4). Alternatively, the second subscription may be configured to utilize fewer technologies and operating modes. For example, the second subscription may only support G voice and G data modes. Based on the active mode of the individual subscriptions, various features may be available simultaneously.

For illustration purposes: when the second subscription is operating in G voice mode, the second subscription may not support a dual transfer mode (or DTM), regardless of the mode of operation of the first subscription. In such a case, the first subscription may utilize numerous features dependent upon its own set mode. For example, as shown in table block 402, when operating in W/C/T data mode, the first subscription may utilize features such as high speed packet access (or HSPA) Category 14 (or Cat. 14)/Category 6 (or Cat. 6) DL/UL (or downlink/uplink), and supported receive diversity support (or RxD supported). In table block 404, when operating in W/C/T voice mode, the first subscription may utilize features such as supported 3-way calling across both SIMs with only one audio path connected at a time, and supported adaptive multi-rate speech codec wide band support (or AMR-WB). In table block 406, when operating in G data mode, the first subscription may utilize features such as enhanced data rates for global evolution (or EDGE) using a certain multislot class (or MSC-33). In table block 408, when operating in G voice mode, the first subscription may utilize features such as supported 3-way calling across the subscriptions where only one audio path at a time may be connected and supported AMR-WB. In an embodiment, the second subscription may utilize DTM-Class 11 when configured to operate in G voice mode.

For further illustration: in table block 410, when the second subscription is operating in G data mode and the first subscription is operating in W/C/T data mode, the first subscription may utilize features such as HSPA Cat. 14/Cat. 6 DL/UL, and supported RxD, and the second subscription may utilize features such as EDGE MCS-33 and DTM-Class 11. In table block 412, when the first subscription is operating in W/C/T voice mode and the second subscription is operating in G data mode, the first subscription may utilize features such as supported AMR-WB, and the second subscription may utilize features such as EDGE MCS-33 and DTM-Class 11. In table block 414, when the first subscription is operating in G data mode and the second subscription is operating in G data mode, the first subscription may utilize features such as EDGE MCS-33, and the second subscription may utilize features such as EDGE MCS-33 and DTM-Class 11. In table block 416, when the first subscription is operating in G data mode and the second subscription is operating in G data mode, the first subscription may utilize features such as supported AMR-WB, and the second subscription may utilize features such as EDGE MCS-33 and DTM-Class 11.

FIG. 4 illustrates concurrent features/modes/technologies of an example DSDA mobile device that may be configured to implement embodiment feed forward methods. However, mobile devices that are configured to utilize two or more multi-mode SIM cards or mobile devices configured to utilize various other communication protocols, standards, and technologies may also utilize the embodiment methods described herein.

Figure 5:
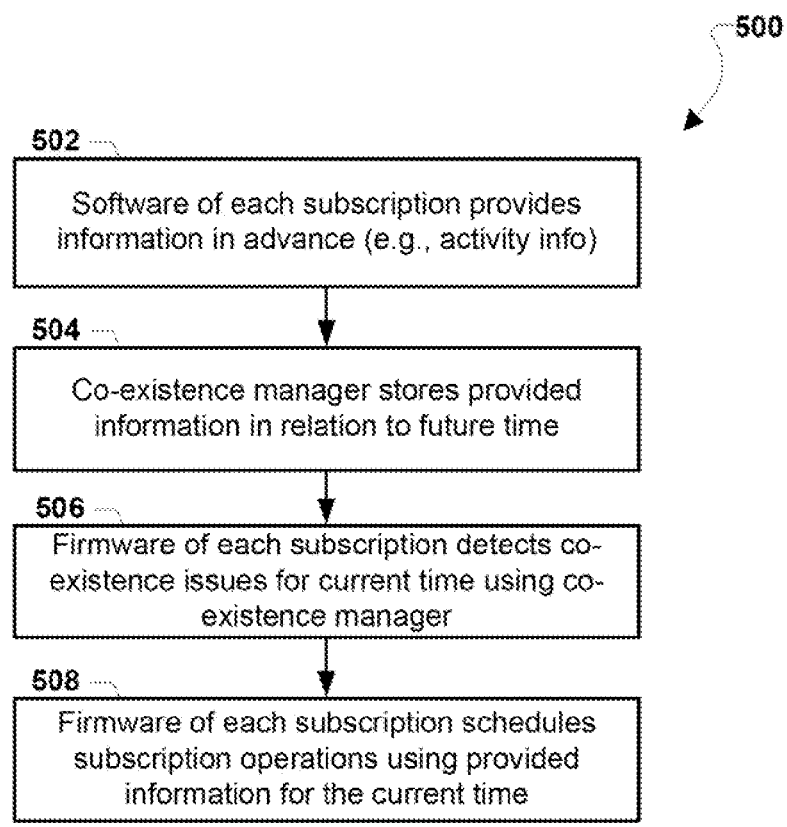
FIG. 5 is a process flow diagram illustrating a simplified embodiment method for using feed forward strategy to schedule subscriptions in a DSDA mobile device.

FIG. 5 illustrates a simplified embodiment method 500 for a DSDA mobile device using a feed forward strategy to schedule subscriptions. In block 502, software-implemented operations of each subscription may provide information in advance. For example, software-implemented operations associated with a subscription utilizing a WCDMA technology may generate information that describes the activities, operations, and processes the subscription may perform in a future time period. The information may include various parameters that software-implemented operations identify as relevant in determining whether coexistence issues may exist in the future. In particular, the information may include activity information that indicates whether the subscription will be transmitting and/or receiving data (e.g., downlink data, voice data, etc.) in a future activity interval, priorities or rankings of the subscription and/or the technologies associated with the subscription in the future activity interval, and desense-related tags or other indicators. In an embodiment, the software-implemented operations may provide information predicted to occur within one to two milliseconds in the future.

In block 504, a coexistence manager may store the provided information in relation to a future time. As described above the coexistence manager may be a module within a common library accessibly by the various subscriptions active within the mobile device. The coexistence manager may store the provided information from the software-implemented operations within a database, such as a relational database.

In block 506, firmware of each subscription may detect coexistence issues for a current time using the coexistence manager. In other words, the firmware may make function calls to a library common to both subscriptions in order to determine whether conflicts, overlaps, and desense conditions exist in the current activity interval. Such function calls may query, access, and otherwise utilize the information provided by the software-implemented operations and stored by the coexistence manager to categorize the activity of one subscription in relation to the activity of the other subscription. The firmware may utilize information that indicates the type of activity of the subscriptions (e.g., Rx, Tx operations) to identify whether coexistence issues exist. As described above, as the activity information may be predicted in advance by the software-implemented operations, the firmware of each subscription may not be required to communicate with the software-implemented operations in real-time, and thus may detect coexistence issues within microseconds. In an embodiment, the detection of coexistence issues may occur every half-slot.

In block 508, the firmware may schedule subscription operations using the provided information for the current time. The firmware may use priority information associated with the predicted activity of the subscription for the current time to identify whether each subscription's operations need to be adjusted or re-scheduled from their normal executions and operations. In particular, the firmware may determine whether to perform blanking or back-off operations for a subscription based on the priority of the subscription compared to the other subscription as indicated in the information provided in advance by the software-implemented operations. For example, the firmware associated with a lower priority subscription may perform a blanking operation on a transmission of data until the operations of a higher priority subscription have completed.

In an embodiment, the coexistence manager may calculate or determine whether transmitting (Tx) and/or receiving (Rx) coexistence issues exist, such as cross-talk issues. In other embodiments, firmware associated with subscriptions utilizing particular technologies (e.g., GSM) may or may not turn off receiving (or Rx) operations during blanking operations. In other words, not all technologies require blanking operations to be turned off.

Figure 6:
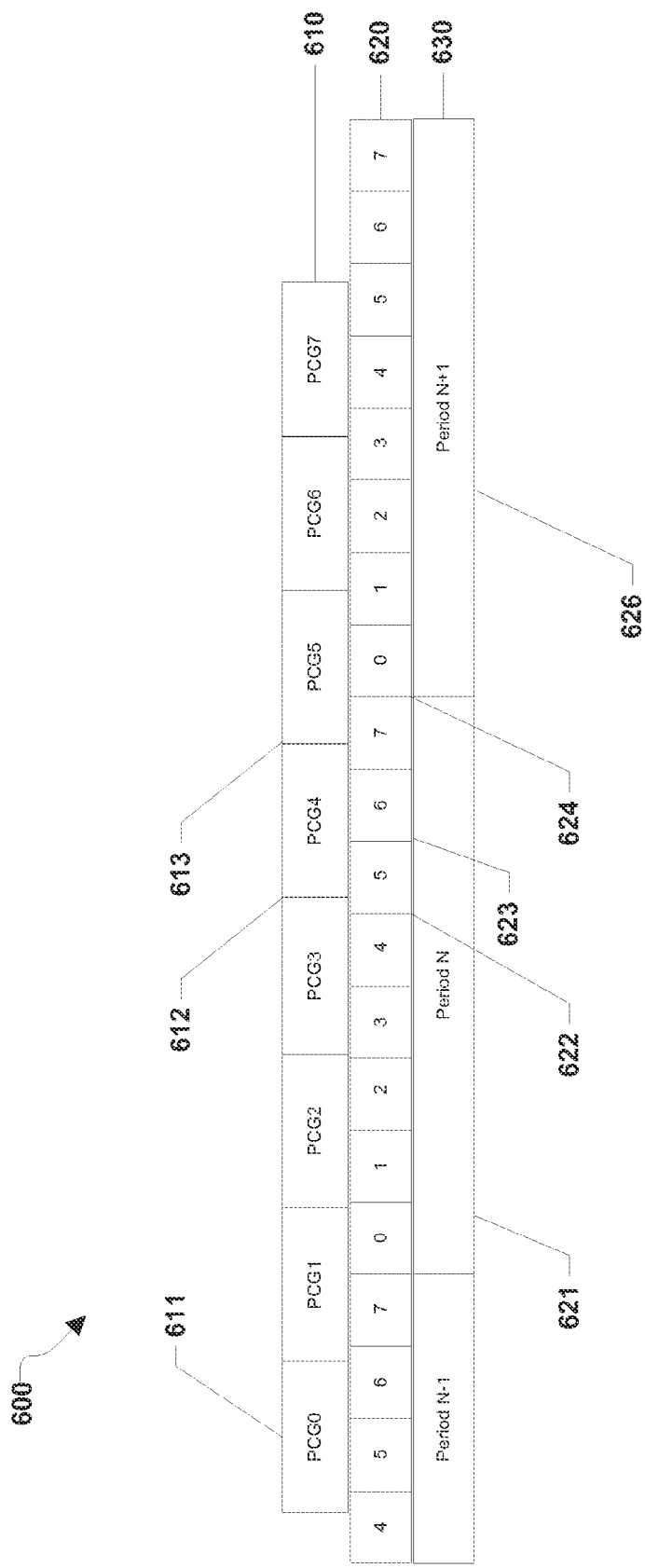
FIG. 6 is a diagram illustrating an embodiment timeline in a DSDA implementation.

FIG. 6 illustrates a diagram 600 of a measurement timeline relevant to an embodiment DSDA implementation. In particular, the diagram 600 shows a simplified timeline that may be experienced by an embodiment DSDA mobile device performing the operations of FIG. 5 described above or the operations of FIG. 7 described below. For the purposes of illustration, the DSDA mobile device may utilize a first subscription using a CDMA technology (e.g., CDMA 1×) and a second subscription using a GSM technology.

The diagram 600 shows a set of power control group (or PCG) blocks 610 associated with the first subscription. In other words, the scheduling of the first subscription may be considered to be at a PCG rate. In an embodiment, each PCG block, such as a first PCG block 611, may have a duration of 1.25 milliseconds (i.e., the first subscription processes PCG blocks at a 1.25 ms interval). The diagram 600 also shows a set of time periods 630 and a set of time slots 620 associated with the second subscription. Each time period, such as a current time period 621 (i.e., "Period N"), may coincide with a certain number of time slots. For example, as illustrated in the diagram 600, a single GSM time period may coincide with eight (8) time slots. In various embodiments, such time slots may be a measure of the reaction time of firmware associated with the subscriptions.

To avoid handshaking and suboptimal performance during a coexistence issue (e.g., desense due to interference from the concurrently active subscriptions), the DSDA mobile device may perform operations to provide data to a coexistence manager in advance. In other words, the DSDA mobile device may provide predicted activity information to the coexistence manager as described above with reference to FIG. 5. As an illustration, at a current time slot 622 that occurs within the current time period 621, the DSDA mobile device may register activity information for the second subscription (i.e., GSM technology) that is predicted to occur at a future time slot 624 within a future time period 626. As described throughout the disclosure, such a registration may include software-implemented operations and/or firmware generating activity information in advance and transmitting that predicted activity information to be stored in a common library (i.e., coexistence manager). The first subscription (i.e., CDMA technology) may register predicted activity information for a future power control group block 613 (referred to as 'PCG5' in FIG. 6) during the timeline corresponding to a current power control group block 612 (referred to as 'PCG4' in FIG. 6). In an embodiment, the first subscription may predict activity information for the future power control but may also poll at a half-PCG rate (i.e., polling may be performed by the 1×CDMA technology two times during the timeline corresponding to each power control group block).

In an embodiment, the second subscription may be configured to perform a conflict check (e.g., determine whether the subscription activities are overlapping, whether there is desense, etc.) at a next time slot 623. In other words, the second subscription may utilize predicted activity data accessible via the coexistence manager to determine whether the predicted operations related to the first subscription (e.g., a data or voice call using CDMA technology) may cause desense with the predicted operations related to the second subscription (e.g., a data or voice call using GSM technology).

In an embodiment, the DSDA mobile device may be configured to check for conflicts at varying rates. For example, if the DSDA mobile device has not experienced any desense conditions and/or the type of channel of communication has not been modified for a period (i.e., the device is stable), conflict checks may not be performed often until a conflict is detected. As another example, when the DSDA mobile device has experienced dynamic conditions (e.g., numerous handovers, etc.), the DSDA mobile device may employ a higher rate of conflict check operations. In another embodiment, the DSDA mobile device may perform conflict checks based on whether the activities of the concurrently active subscriptions are determined to have different priorities or rankings. For example, the DSDA mobile device may not perform conflict checks when the first subscription continues to process a voice call and thus has a high priority over a data call on the second subscription. In other words, the rate at which the DSDA mobile device performs operations to determine whether coexistence issues exist may be adjusted based on the stability and/or content exchanged via the various concurrently active subscriptions.

Figure 7:
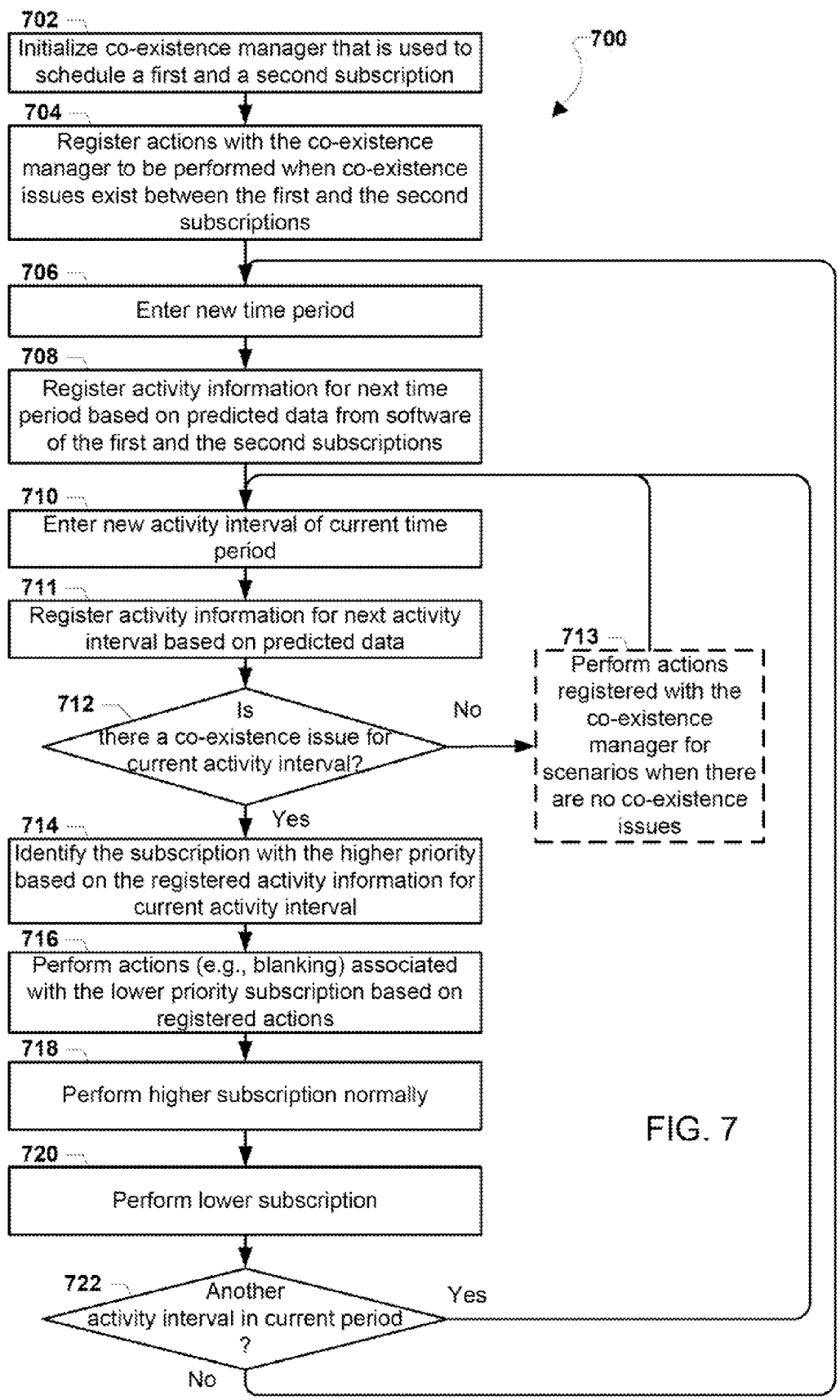
FIG. 7 is a process flow diagram illustrating an embodiment method for using feed forward strategy to schedule subscriptions in a DSDA mobile device.

FIG. 7 is a process flow diagram illustrating an embodiment method 700 for using a feed forward strategy to schedule concurrently active subscriptions in a DSDA mobile device. In block 702, the mobile device may initialize a coexistence manager that is used to schedule a first and a second subscription. In an embodiment, the coexistence manager may be included within a common library that is comprised of functions and logic accessible by software-implemented operations and/or firmware associated with both concurrently active subscriptions. In block 704, the mobile device may register actions with the coexistence manager to be performed when coexistence issues exist between the first and the second subscriptions. In other words, the software-implemented operations of the concurrent subscriptions may generate and register the actions with the coexistence manager. For example, the registered actions may be configurations, commands, scheduling directives, and other information firmware associated with the subscriptions may utilize to schedule operations to correct desense conditions. In block 706, the mobile device may enter a new time period. In other words, the mobile device may begin processing operations occurring in the time period. In block 708, the mobile device may register activity information for a next time period based on predicted data from software-implemented operations of the first and the second subscriptions. Software-implemented operations associated with the different subscriptions may generate predicted activity information (or long-term predictions) of the activities, operations, and states of the subscriptions. For example, software-implemented operations may determine the state of a subscription for the next time period as being involved in a data downlink based on similar activity over the past several time periods. Additionally, such activity information may be considered long-term in that the activities predicted for the next time period may include predicted activity information predicted to occur over a period of a plurality of activity intervals. In an embodiment, in order to maintain accuracy, such long-term activity information for the next time period may lack the fine granularity of the short-term information described below with reference to the operations in block 711.

In block 710, the mobile device may enter a new activity interval of the current time period. The activity interval may be a time increment, such as a time slot, within the current time period. For example, the current time period may include numerous time slots or activity intervals. In an embodiment, the mobile device may generate interrupt signals for each activity interval within a time period. For example, firmware associated with a first subscription may transmit an interrupt signal once per activity interval.

In block 711, the mobile device may register activity information for the next activity interval based on predicted data, such as the predicted data for the current time period provided by the software-implemented operations of the subscriptions. In an embodiment, the mobile device may utilize firmware to register the activity information for the next activity interval. Additionally, such activity information may be considered short-term in that the activities predicted for the next activity interval may be updated and/or based on dynamic conditions of the mobile device from one activity interval to the next.

In determination block 712, the mobile device may determine whether a coexistence issue for the current activity interval exists. For example, the coexistence manager may compare registered (or predicted) activity data to detect overlapping or conflicts of the operations of the two subscriptions. In an embodiment, the mobile device may determine coexistence issues exists based on the state of the subscriptions (e.g., in a voice call, on local hold, etc.), power use related to the activities of the subscriptions, and/or the radiation associated with the activities of the subscriptions. For example, the mobile device may determine a coexistence issue exists when the coexistence manager determines the radiation output of the first subscription activities in combination with the output of the second subscription activities exceeds a safe limit for humans (e.g., SAR limit). In an embodiment, the operations in determination block may be performed by the mobile device to determine whether coexistence issues exist regarding inter radio access technologies of the same subscription. Alternatively, the mobile device may be configured to never determine coexistence issues exist based on the activities of a single subscription. If a coexistence issue does not exist for the current activity interval (i.e., determination block 712="No"), in optional block 713, the mobile device may perform actions registered with the coexistence manager for scenarios when there are no coexistence issues and then may continue with the operations in block 710. Such actions may include standard operations for the individual subscriptions (e.g., those actions that would be performed when no concurrency existed), and/or operations predefined by the software-implemented operations associated with the subscriptions.

If a coexistence issue exists for the current activity interval (i.e., determination block 712="Yes"), in block 714 the mobile device may identify the subscription with the higher priority based on the registered activity information for the current activity interval. In other words, the mobile device may identity the priorities of the subscriptions and determine the subscriptions with the higher priority. In particular, the coexistence manager may utilize the registered activity information corresponding to the current activity interval to determine the subscription that is engaged in an activity that takes precedence over the other subscription's activities. For example, the coexistence manager may determine the current state of activity of a first subscription as relating to a data call and the current state of activity of a second subscription as relating to an active voice call and thus identity that the second subscription has priority over the first subscription. In various embodiments, the mobile device may identify the priority of a plurality of technologies and/or operations associated with the first and second subscriptions. For example, the mobile device may identity the priority of receiving operations and the priority of transmitting operations for both the first and second subscriptions for a certain activity interval. In this way, some operations from the first subscription may be higher priority than some operations from the second subscription, and vice versa.

In block 716, the mobile device may perform actions, such as blanking operations, associated with the lower priority subscription based on the registered actions. For example, the registered actions provided by software-implemented operations of the first subscription may indicate that when the operations of the first subscription (e.g., Tx) are lower priority than the operations of the second subscription (e.g., Rx), the mobile device should perform blanking or back-off procedures for the lower priority subscription. In block 718, the mobile device may perform the higher subscription normally. In other words, when the operations of a subscription are determined to be higher priority than the operations of another subscription, the mobile device may not modify the execution of the operations of the higher priority subscription. For example, a higher priority transmission operation may not be frozen, blanked, or otherwise re-scheduled. In block 720, the mobile device may perform the lower subscription. For example, after the higher subscription operations are performed normally, the coexistence issue may be avoided and thus the lower subscription operations may be unfrozen or otherwise performed normally. In determination block 722, the mobile device may determine whether there is another activity interval in the current time period. In other words, the mobile device may determine whether it has evaluated all time slots, scheduling intervals, and/or activity intervals within the current time period. If there is another activity interval in the current time period (i.e., determination block 722="Yes"), the mobile device may continue with the operations in block 710. For example, the mobile device may proceed to evaluate the registered or predicted activity data for the subscriptions for the next activity interval.

However, if there is not another activity interval in the current time period (i.e., determination block 722="No"), the mobile device may continue with the operations in block 706. For example, the mobile device may register activity information for a future time period based on predicted data from software-implemented operations associated with the subscriptions.

Figure 8:
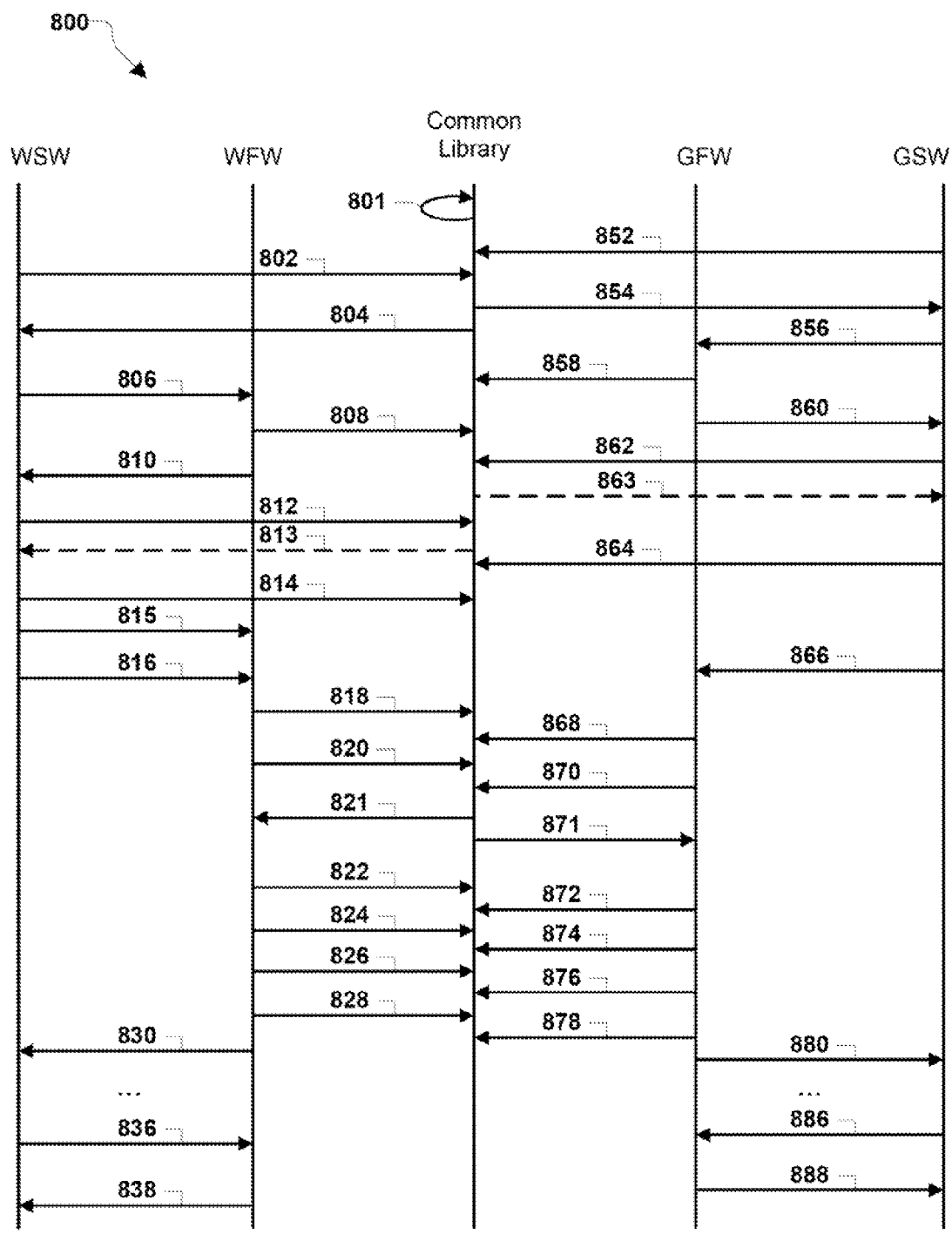
FIG. 8 is a call flow diagram illustrating an embodiment implementation of a feed forward strategy to schedule operations related to a CDMA subscription and a GSM subscription executing in a DSDA mobile device.

FIG. 8 shows a call flow diagram 800 that illustrates an embodiment implementation of a feed forward strategy to schedule operations related to different communication technologies simultaneously executing in a DSDA mobile device. The mobile device may be configured to simultaneously operate a first subscription that utilizes Wideband Code Division Multiple Access (or WCDMA) technology as well as a second subscription that utilizes Global System for Mobile Communications (or GSM) technology. The first subscription may be associated with, access, and otherwise utilize software-implemented operations (referred to as "WSW" in FIG. 8) and firmware (referred to as "WFW" in FIG. 8) that is configured for the WCDMA technology. The second subscription may be associated with, access, and otherwise utilize software-implemented operations (referred to as "GSW" in FIG. 8) and firmware (referred to as "GFW" in FIG. 8) that is configured for the GSM technology. In various other embodiments, the feed forward strategy may be implemented by mobile devices with a plurality of technologies (e.g., multiple RATs or IRATs) and/or subscriptions that may or may not utilize multi-mode configurations. For example, a DSDA mobile device configured to perform an embodiment method may be configured to utilize four SIM cards.

The mobile device may utilize a common firmware and/or software library that may be accessible by either the first or the second subscription and/or the firmware and software-implemented operations associated with the first and/or second firmware. This common library (referred to as "Common Library" in FIG. 8) may include coexistence manager modules as described above. For example, the common library may include a set of API calls, functions, and/or instructions as well as stored data, such as activity information of active subscriptions for a time period. The common library may be accessed by the software-implemented operations and/or firmware associated with the various active subscriptions of the mobile device. In an embodiment, the common library may include a coexistence manager module to process information associated with the subscriptions' software-implemented operations (e.g., the MCS component described above with reference to FIG. 3) as well as a coexistence manager module to process information associated with the subscriptions' firmware. For example, the common library may include a MCS component that stores a database of various band and channel combinations as well as information indicating whether desense conditions exist with the combinations. The coexistence managers of the common library may also maintain a database or other similar data structure that stores priority information of the various subscriptions. In an embodiment, the MCS component may not store information that indicates activity timing of the concurrently executing subscriptions. In other words, the software-implemented operations coexistence manager may not maintain information that can be used to determine whether radio access technologies overlap.

The DSDA mobile device may first initialize the common library for the active subscriptions with the signal 801. For example, the mobile device may boot-up or otherwise initialize modules that can interface with the software-implemented operations and firmware associated with the WCDMA and GSM subscriptions. The WCDMA subscription software-implemented operations may enable a related WCDMA firmware app (or application) indicated to the common library with the signal 802, and the GSM subscription software-implemented operations may enable a related GSM firmware app (or application) indicated to the common library with the signal 852. The common library may transmit a first firmware app enabled response signal 804 to the WCDMA software-implemented operations, and a second firmware app enabled response signal 854 to the GSM software-implemented operations. For example, the firmware app enabled response signals 804, 854 may include tokens, codes, or other information that confirms the receipt of the firmware app signals 802, 852.

The WCDMA software-implemented operations may enable the coexistence manager of the common library with the signal 806 and the WCDMA firmware may register transmission (Tx) back-off and/or receive (Rx) blanking callbacks with the signal 808. Likewise, the GSM software-implemented operations may enable the coexistence manager of the common library with the signal 856 and the GSM firmware may register transmission (Tx) back-off and/or receive (Rx) blanking callbacks with the signal 858. The signals 806, 808, 856, 858 may enable, activate, or otherwise prepare the coexistence manager to receive data from the WCDMA and/or GSM software-implemented operations and firmware. In an embodiment, the signals 806, 856 may include actions, such as the transmission (Tx) back-off and/or receive (Rx) blanking callbacks, that may be stored by the coexistence manager of the common library. The WCDMA firmware may transmit a response signal 810 to the WCDMA software-implemented operations indicating that the common library (and the coexistence manager) has been enabled for processing information associated with the WCDMA subscription, and the GSM firmware may transmit a response signal 860 to the GSM software-implemented operations indicating that the common library (and the coexistence manager) has been enabled for processing information associated with the GSM subscription.

The WCDMA software-implemented operations may query the common library (in particular the MCS component) for coexistence issues or conditions with the signal 812, and the GSM software-implemented operations may query the common library for coexistence issues or conditions with the signal 862. Such querying may occur on a periodic basis, such as every time period. In an optional embodiment, the common library may transmit a response signal 813 to the WCDMA software-implemented operations in response to receiving the signal 812, and may also transmit a response signal 863 to the GSM software-implemented operations in response to receiving the signal 862. In other words, it may be optional whether the common library responds to signals related to registrations by software-implemented operations.

The WCDMA software-implemented operations may register long-term activity with the common library for re-scheduling purposes with a signal 814, and the GSM software-implemented operations may also register long-term activity with the common library for re-scheduling purposes with a signal 864. In an embodiment, the WCDMA software-implemented operations may also transmit a signal 815 to the WCDMA firmware that requests operations be performed by the WCDMA firmware with reference to a random access channel or "RACH." For example, the signal 815 may request the reschedule of a search that utilizes the random access channel accessible by the WCDMA firmware.

The signals 816-830 and 866-880 described below may be considered illustrative of the novel feed forward techniques of the various embodiments. The WCDMA software-implemented operations may transmit a signal 816 to the WCDMA firmware and the GSM software-implemented operations may transmit a signal 866 to the GSM firmware that registers priority information for the respective subscriptions for a next time period. The signals 816, 866 may include information that the common library may utilize to facilitate long-term scheduling (or re-scheduling) of the operations of the subscriptions. For example, the signals 816, 866 may include information that indicates the subscriptions are predicted to be engaged in data or voice calls for a particular time period in the future.

The WCDMA firmware may register Rx/Tx priority for a next activity of the WCDMA subscription (or scheduling) interval by transmitting a signal 818 to the common library, and the GSM firmware may register Rx/Tx priority of the GSM subscription for a next activity (or scheduling) interval by transmitting a signal 868 to the common library. In an embodiment, the signals 818, 868 may include information that the common library may utilize to facilitate short-term scheduling (or re-scheduling) of the operations of the subscriptions. For example, the signals 818, 868 may include priority information related to the operations of the subscriptions that may occur in a particular slot of a time period.

The WCDMA firmware may execute a conflict check by transmitting a signal 820 to the common library (e.g., the coexistence manager), and the GSM firmware may execute a conflict check by transmitting a signal 870 to the common library. In various embodiments, the common library may be used to compare the priorities of the Rx and Tx for both subscriptions for each time slot within a time period to determine which action has the highest priority. In other words, the priorities of the Rx and Tx operations of the two subscriptions may be compared separately to determine a ranking. For example, for the current time slot, a WCDMA Rx operation may have a higher priority than a GSM Tx operation, a WCDMA Tx operation may have a higher priority than the WCDMA Rx operation, and a GSM Rx operation may have a higher priority than the WCDMA Tx operation. In another embodiment, to implement battery current limiting, the common library may be used to detect conflicts between Tx operations of the two subscriptions and provide scheduling information schedule based on the priorities of the Tx operations.

In response to the signals 820, 870, the WCDMA firmware may receive a signal 821 from the common library that indicates whether there is a coexistence issue (or conflict), and the GSM firmware may receive a signal 871 from the common library that indicates whether there is a coexistence issue (or conflict). The signals 821, 871 may include information that indicates whether the Tx or Rx activities of the WCDMA and GSM may be scheduled to perform immediately or after a period elapses and/or blanking operations are performed based on priority information stored via the common library. For example, the signals 821, 871 may include a flag, code, or other information that indicates whether the Tx or Rx of the WCDMA subscription wins a contest with the Tx or Rx of the GSM subscription. Additionally, the signals 821, 871 may include actions, instructions, or other commands for scheduling winning or losing operations of the subscriptions. For example, the signal 821 may indicate the blanking operations and related timing information for the WCDMA firmware to perform when the current Tx operations of the WCDMA subscription do not have a higher priority than the current Rx operations of the GSM subscription. In an embodiment, conflict checks and priority decisions may be performed by the mobile device within two to three microseconds.

In an embodiment, when the signal 821 indicates that a Tx operation does not have a higher priority than other operations, the WCDMA firmware may transmit a signal 822 to the common library that indicates the WCDMA firmware may perform blanking with reference to the Tx operation. For example, when desense is detected and the WCDMA Tx operation does not have a higher priority than an Rx operation, the WCDMA firmware may schedule the Tx operation to freeze for a period before resuming execution. The GSM firmware may transmit a signal 872 that indicates an Rx operation is scheduled for execution by the mobile device in the next time slot in the current time period (i.e., the Rx operation of the GSM subscription has the highest priority). The WCDMA firmware may transmit a signal 824 to the common library that indicates the WCDMA Rx operation has the next priority, and the GSM firmware may transmit a signal 874 that indicates the GSM Tx operation has a lower priority and thus may encounter blanking. The WCDMA firmware may then transmit a signal 826 to the common library that indicates an Rx operation for the WCDMA subscription has the higher priority and may be scheduled for execution in the next time slot. The GSM firmware may transmit a signal 876 to the common library that indicates the GSM firmware may perform blanking or back-off with reference to the Tx operation of the GSM subscription.

In an embodiment, the subscriptions may transmit signals related to conflict checks for each operation. For example, the WCDMA firmware may be configured to query the common library to determine the priority/scheduling information for a Rx operation as well as query the common library to determine the priority/scheduling information for a Tx operation.

The WCDMA firmware may register another Rx/Tx priority for a next activity of the WCDMA subscription (or scheduling) interval by transmitting a signal 828 to the common library, and the GSM firmware may register another Rx/Tx priority of the GSM subscription for a next activity (or scheduling) interval by transmitting a signal 878 to the common library. The WCDMA firmware may transmit a signal 830 to the WCDMA software-implemented operations that includes a final action report that may be further delivered to Layer 1 software-implemented operations, and the GSM firmware may transmit a signal 880 to the GSM software-implemented operations that includes a final action report that may be further delivered to Layer 1 software-implemented operations. The signals 830, 880 may be considered responses of the common library that indicate how the two subscriptions should behave. The DSDA mobile device may repeat the processes related to signals 816-830 and signals 866-880 for a period of time. For example, as long as the two subscriptions are concurrently active, the DSDA mobile device may repeat the operations for registering activity information with the common library and scheduling Tx/Rx operations based on priority. The WCDMA software-implemented operations may transmit a signal 836 to the WCDMA firmware that instructs the common library (and coexistence manager) to disable and/or de-register with respect to the WCDMA subscription, and the GSM software-implemented operations may transmit a signal 886 to the GSM firmware that instructs the common library (and coexistence manager) to disable and/or de-register with respect to the GSM subscription. In response, the WCDMA firmware may transmit a response signal 838 that confirms that the common library (and coexistence manager) has de-registered the WCDMA subscription, and the GSM firmware may transmit a response signal 888 that confirms that the common library has de-registered the GSM subscription.

Figure 9:
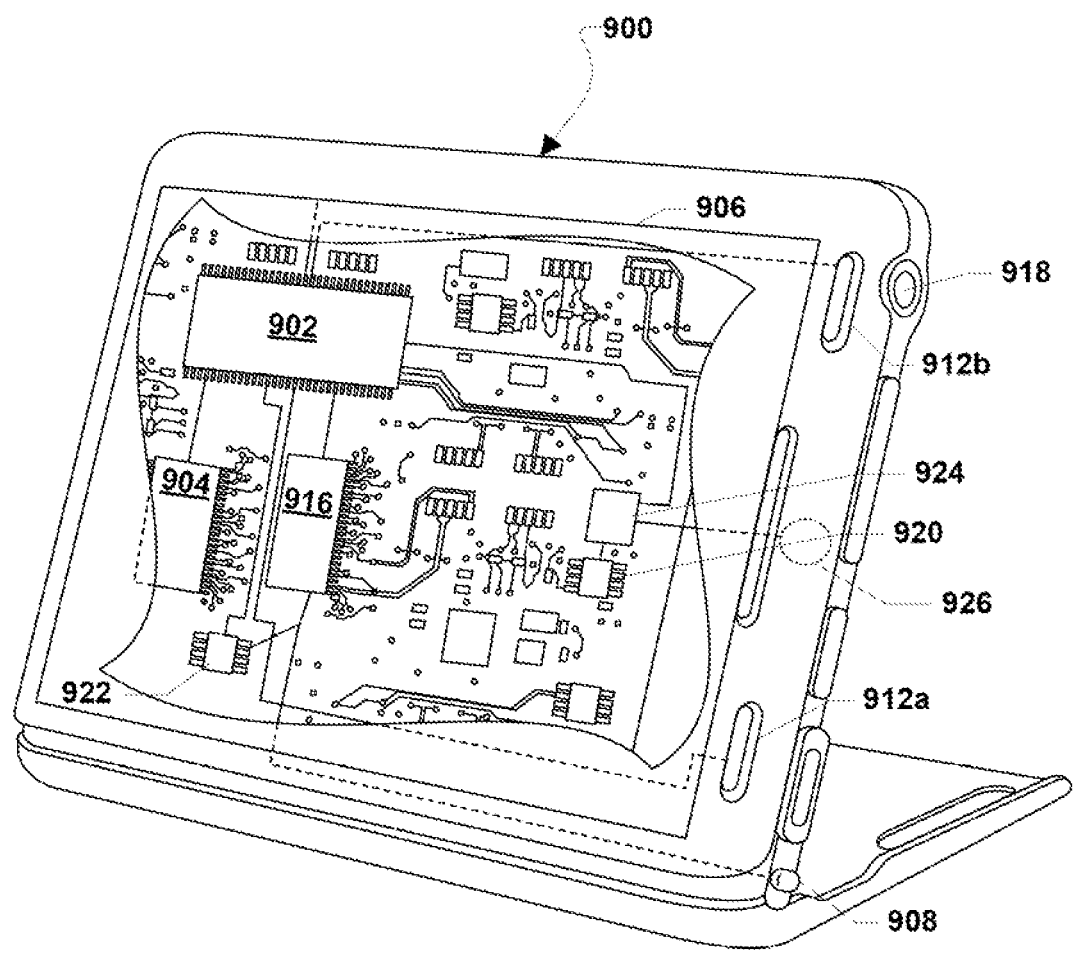
FIG. 9 is a component block diagram of a mobile device suitable for use in an embodiment.

FIG. 9 illustrates components of a mobile device 900 configured to operate as a DSDA mobile device and suitable for use with any of the embodiments. For example, the DSDA mobile device 900 may include a processor 902 coupled to internal memory 904. Internal memory 904 may be volatile or non-volatile memory, and may also be secure and/or encrypted memory, or unsecure and/or unencrypted memory, or any combination thereof. The processor 902 may also be coupled to a touch screen display 906, such as a resistive-sensing touch screen, capacitive-sensing touch screen infrared sensing touch screen, or the like. Additionally, the display of the DSDA mobile device 900 need not have touch screen capability. Additionally, the DSDA mobile device 900 may have one or more antenna 908 for sending and receiving electromagnetic radiation that may be connected to a wireless data link and/or cellular telephone transceiver 916 coupled to the processor 902. The DSDA mobile device 900 may also include physical buttons 912a and 912b for receiving user inputs. The DSDA mobile device 900 may also include a power button 918 for turning the DSDA mobile device 900 on and off. The DSDA mobile device 900 may have a first SIM card 922 that may utilize a cellular telephone transceiver 916 and one or more antennae 908 to connect to a first mobile network. The DSDA mobile device may also have a second SIM card 920 that may utilize a cellular telephone transceiver 924 and one or more antennae 926 to connect to a second mobile network The processor 902 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 904 before they are accessed and loaded into the processor 902. The processor 902 may include internal memory sufficient to store the application software instructions. In many devices the internal memory may be a volatile or nonvolatile memory, such as flash memory, or a mixture of both. For the purposes of this description, a general reference to memory refers to memory accessible by the processor 902 including internal memory or removable memory plugged into the device and memory within the processor 902.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module that may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium that may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a dual-subscriber identity module (SIM), dual-active (DSDA) mobile device to efficiently resolve coexistence issues by utilizing a feed forward strategy, comprising:
   initializing a coexistence manager configured to schedule at least a first subscription and a second subscription;
   storing, in the coexistence manager, information provided in advance by software-implemented operations of the first subscription and the second subscription;
   detecting whether a coexistence issue will exist for an activity interval within a current time period using firmware of the first subscription and the second subscription and the information provided to the coexistence manager in advance; and
   scheduling operations with the firmware of the first subscription and the second subscription using the information provided to the coexistence manager in advance of when the coexistence issue will exist.

2. The method of claim 1, wherein storing, in the coexistence manager, information provided in advance by the software-implemented operations of the first subscription and the second subscription comprises:
   generating actions with the software-implemented operations of the first subscription and the second subscription;
   registering the actions and information related to the first subscription and the second subscription with the coexistence manager, wherein the information related to the first subscription and the second subscription includes priority information; and
   registering in advance predicted activity information for the first subscription and the second subscription for a future time period with the coexistence manager.

3. The method of claim 2, wherein detecting whether a coexistence issue will exist for an activity interval within a current time period using firmware of the first subscription and the second subscription and the information provided to the coexistence manager in advance comprises:
   determining, with the firmware associated with the first subscription and the second subscription, whether the coexistence issue exists for the activity interval within the current time period based on the registered predicted activity information.

4. The method of claim 3, further comprising:
   identifying priorities of the first subscription and the second subscription with the firmware based on registered activity information of the current time period when the coexistence issue exists; and
   performing the first subscription and the second subscription with the firmware based on the identified priorities and the registered actions.

5. The method of claim 4, wherein performing the first subscription and the second subscription with the firmware based on the identified priorities and the registered actions comprises:
   identifying a subscription that has a lower priority based on the identified priorities;
   performing normal operations of a subscription that has a higher priority during a first period;
   performing the registered actions associated with the subscription that has the lower priority during the first period; and
   performing normal operations of the subscription that has the lower priority during a second period in response to performing the registered actions during the first period.

6. The method of claim 1, wherein the scheduled operations include at least blanking and back-off operations.

7. The method of claim 1, wherein the coexistence issue is one of an unacceptable specific absorption rate, suboptimal battery current use, and a desense condition of either the first subscription or the second subscription.

8. The method of claim 1, further comprising generating predicted activity information for a future time period with the software-implemented operations of the first subscription and the second subscription.

9. The method of claim 8, wherein the future time period is from one to two milliseconds after the current time period.

10. A mobile device configured to efficiently resolve coexistence issues by utilizing a feed forward strategy, comprising:
    a processor configured with processor-executable instructions to:

initialize a coexistence manager configured to schedule at least a first subscription and a second subscription;

store, in the coexistence manager, information provided in advance by software-implemented operations of the first subscription and the second subscription;

detect whether a coexistence issue will exist for an activity interval within a current time period using firmware of the first subscription and the second subscription and the information provided to the coexistence manager in advance; and schedule operations with the firmware of the first subscription and the second subscription using the information provided to the coexistence manager in advance of when the coexistence issue will exist.

11. The mobile device of claim 10, wherein the processor is configured with processor-executable instructions to perform operations such that storing, in the coexistence manager, information provided in advance by software-implemented operations of the first subscription and the second subscription comprises:

generating actions with the software-implemented operations of the first subscription and the second subscription;

registering the actions and information related to the first subscription and the second subscription with the coexistence manager, wherein the information related to the first subscription and the second subscription includes priority information; and registering in advance predicted activity information for the first subscription and the second subscription for a future time period with the coexistence manager.

12. The mobile device of claim 11, wherein the processor is configured with processor-executable instructions to perform operations such that detecting whether a coexistence issue will exist for an activity interval within a current time period using firmware of the first subscription and the second subscription and the information provided to the coexistence manager in advance comprises:

determining, with the firmware associated with the first subscription and the second subscription, whether the coexistence issue exists for the activity interval within the current time period based on the registered predicted activity information.

13. The mobile device of claim 12, wherein the processor is further configured with processor-executable instructions to:

identify priorities of the first subscription and the second subscription with the firmware based on registered activity information of the current time period when the coexistence issue exists; and perform the first subscription and the second subscription with the firmware based on the identified priorities and the registered actions.

14. The mobile device of claim 13, wherein the processor is configured with processor-executable instructions to perform operations such that performing the first subscription and the second subscription with the firmware based on the identified priorities and the registered actions comprises:

identifying a subscription that has a lower priority based on the identified priorities;

performing normal operations of a subscription that has a higher priority during a first period;

performing the registered actions associated with the subscription that has the lower priority during the first period; and performing normal operations of the subscription that has the lower priority during a second period in response to performing the registered actions during the first period.

15. The mobile device of claim 10, wherein the scheduled operations include at least blanking and back-off operations.

16. The mobile device of claim 10, wherein the coexistence issue is one of an unacceptable specific absorption rate, suboptimal battery current use, and a desense condition of either the first subscription or the second subscription.

17. The mobile device of claim 10, wherein the processor is configured with processor-executable instructions to perform operations further comprising generating predicted activity information for a future time period with the software-implemented operations of the first subscription and the second subscription.

18. The mobile device of claim 17, wherein the future time period is from one to two milliseconds after the current time period.

19. A mobile device configured to efficiently resolve coexistence issues by utilizing a feed forward strategy, comprising:

means for initializing a coexistence manager configured to schedule at least a first subscription and a second subscription;

means for storing, in the coexistence manager, information provided in advance by software-implemented operations of the first subscription and the second subscription;

means for detecting whether a coexistence issue will exist for an activity interval within a current time period using firmware of the first subscription and the second subscription and the information provided to the coexistence manager in advance; and means for scheduling operations with the firmware of the first subscription and the second subscription using the information provided to the coexistence manager in advance of when the coexistence issue will exist.

20. The mobile device of claim 19, wherein means for storing, in the coexistence manager, information provided in advance by software-implemented operations of the first subscription and the second subscription comprises:

means for generating actions with the software-implemented operations of the first subscription and the second subscription;

means for registering the actions and information related to the first subscription and the second subscription with the coexistence manager, wherein the information related to the first subscription and the second subscription includes priority information; and means for registering in advance predicted activity information for the first subscription and the second subscription for a future time period with the coexistence manager.

21. The mobile device of claim 20, wherein means for detecting whether a coexistence issue will exist for an activity interval within a current time period using firmware of the first subscription and the second subscription and the information provided to the coexistence manager in advance comprises:

means for determining, with the firmware associated with the first subscription and the second subscription, whether the coexistence issue exists for the activity interval within the current time period based on the registered predicted activity information.

22. The mobile device of claim 21, further comprising:

means for identifying priorities of the first subscription and the second subscription with the firmware based on registered activity information of the current time period when the coexistence issue exists; and means for performing the first subscription and the second subscription with the firmware based on the identified priorities and the registered actions.

23. The mobile device of claim 22, wherein means for performing the first subscription and the second subscription with the firmware based on the identified priorities and the registered actions comprises:
   means for identifying a subscription that has a lower priority based on the identified priorities;
   means for performing normal operations of a subscription that has a higher priority during a first period;
   means for performing the registered actions associated with the subscription that has the lower priority during the first period; and
   means for performing normal operations of the subscription that has the lower priority during a second period in response to performing the registered actions during the first period.

24. The mobile device of claim 19, wherein the scheduled operations include at least blanking and back-off operations.

25. The mobile device of claim 19, wherein the coexistence issue is one of an unacceptable specific absorption rate, suboptimal battery current use, and a desense condition of either the first subscription or the second subscription.

26. The mobile device of claim 19, further comprising means for generating predicted activity information for a future time period with the software-implemented operations of the first subscription and the second subscription.

27. The mobile device of claim 26, wherein the future time period is from one to two milliseconds after the current time period.

28. A non-transitory processor-readable storage medium having stored thereon processor-executable software instructions configured to cause a processor to perform operations for a mobile device to efficiently resolve coexistence issues by utilizing a feed forward strategy, comprising:
   initializing a coexistence manager configured to schedule at least a first subscription and a second subscription;
   storing, in the coexistence manager, information provided in advance by software-implemented operations of the first subscription and the second subscription;
   detecting whether a coexistence issue will exist for an activity interval within a current time period using firmware of the first subscription and the second subscription and the information provided to the coexistence manager in advance; and
   scheduling operations with the firmware of the first subscription and the second subscription using the information provided to the coexistence manager in advance of when the coexistence issue will exist.

29. The non-transitory processor-readable storage medium of claim 28, wherein the stored processor-executable software instructions are configured to cause the processor to perform operations such that storing, in the coexistence manager, information provided in advance by software-implemented operations of the first subscription and the second subscription comprises:
   generating actions with the software-implemented operations of the first subscription and the second subscription;
   registering the actions and information related to the first subscription and the second subscription with the coexistence manager, wherein the information related to the first subscription and the second subscription includes priority information; and
   registering in advance predicted activity information for the first subscription and the second subscription for a future time period with the coexistence manager.

30. The non-transitory processor-readable storage medium of claim 29, wherein the stored processor-executable software instructions are configured to cause the processor to perform operations such that detecting whether a coexistence issue will exist for an activity interval within a current time period using firmware of the first subscription and the second subscription and the information provided to the coexistence manager in advance comprises:
   determining, with the firmware associated with the first subscription and the second subscription, whether the coexistence issue exists for the activity interval within the current time period based on the registered predicted activity information.

31. The non-transitory processor-readable storage medium of claim 30, wherein the stored processor-executable software instructions are configured to cause the processor to perform operations further comprising:
   identifying priorities of the first subscription and the second subscription with the firmware based on registered activity information of the current time period when the coexistence issue exists; and
   performing the first subscription and the second subscription with the firmware based on the identified priorities and the registered actions.

32. The non-transitory processor-readable storage medium of claim 31, wherein the stored processor-executable software instructions are configured to cause the processor to perform operations such that performing the first subscription and the second subscription with the firmware based on the identified priorities and the registered actions comprises:
   identifying a subscription that has a lower priority based on the identified priorities;
   performing normal operations of a subscription that has a higher priority during a first period;
   performing the registered actions associated with the subscription that has the lower priority during the first period; and
   performing normal operations of the subscription that has the lower priority during a second period in response to performing the registered actions during the first period.

33. The non-transitory processor-readable storage medium of claim 28, wherein the scheduled operations include at least blanking and back-off operations.

34. The non-transitory processor-readable storage medium of claim 28, wherein the coexistence issue is one of an unacceptable specific absorption rate, suboptimal battery current use, and a desense condition of either the first subscription or the second subscription.

35. The non-transitory processor-readable storage medium of claim 28, wherein the stored processor-executable software instructions are configured to cause the processor to perform operations further comprising generating predicted activity information for a future time period with the software-implemented operations of the first subscription and the second subscription.

36. The non-transitory processor-readable storage medium of claim 35, wherein the future time period is from one to two milliseconds after the current time period.

* * * * *